(12) United States Patent
Takahashi et al.

(10) Patent No.: US 12,549,060 B2
(45) Date of Patent: Feb. 10, 2026

(54) COOLANT FLOW PASSAGE STRUCTURE IN ROTATING MACHINE

(71) Applicant: MEIDENSHA CORPORATION, Tokyo (JP)

(72) Inventors: Yohei Takahashi, Tokyo (JP); Takahiko Oishi, Tokyo (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 18/993,491

(22) PCT Filed: Jul. 11, 2023

(86) PCT No.: PCT/JP2023/025608
§ 371 (c)(1),
(2) Date: Jan. 10, 2025

(87) PCT Pub. No.: WO2024/014464
PCT Pub. Date: Jan. 18, 2024

(65) Prior Publication Data
US 2025/0167624 A1    May 22, 2025

(30) Foreign Application Priority Data

Jul. 14, 2022    (JP) .................. 2022-113545

(51) Int. Cl.
*H02K 5/20* (2006.01)
*H02K 9/19* (2006.01)

(52) U.S. Cl.
CPC ............... *H02K 5/203* (2021.01); *H02K 9/19* (2013.01)

(58) Field of Classification Search
CPC ..................................................... H02K 5/203
(Continued)

(56) References Cited

U.S. PATENT DOCUMENTS

| | | |
|---|---|---|
| 11,515,755 B2 | 11/2022 | Krais et al. |
| 12,132,352 B2 | 10/2024 | Murakami et al. |
| 2023/0125199 A1 | 4/2023 | Iijima et al. |

FOREIGN PATENT DOCUMENTS

| | | | |
|---|---|---|---|
| JP | S60-153653 U | | 10/1985 |
| JP | 2014068513 A | * | 4/2014 |

(Continued)

OTHER PUBLICATIONS

JP-2014068513-A Machine translation (Year: 2014).*

*Primary Examiner* — Oluseye Iwarere
*Assistant Examiner* — Minki Chang
(74) *Attorney, Agent, or Firm* — Foley & Lardner LLP (57) ABSTRACT

A coolant flow passage structure is provided in a rotating machine capable of reducing the pressure loss of a coolant flowing through a flow passage, thereby securing a smooth flow of the coolant and improving efficiency. A coolant flow passage structure on a cylindrical frame in a motor and cooling the motor includes a flow passage main body in a wall portion of the frame to extend while meandering, and a bypass flow passage to extend along a circumferential direction of the frame at one of both end portions in an axial direction of the frame. The bypass flow passage communicates front side reverse flow passage portions with each other. The flow passage main body includes straight flow passage portions disposed in a circumferential direction of the frame, and reverse flow passage portions connected to the end portions of the straight flow passage portions.

2 Claims, 6 Drawing Sheets

(58) Field of Classification Search
USPC .............................................. 310/54, 58, 59
See application file for complete search history.

(56) References Cited

FOREIGN PATENT DOCUMENTS

| | | |
|---|---|---|
| JP | 5547783 B2 | 7/2014 |
| JP | 2020-089268 A | 6/2020 |
| JP | 6791463 B1 | 11/2020 |
| WO | WO-2020/017101 A1 | 1/2020 |
| WO | WO-2022/059548 A1 | 3/2022 |

* cited by examiner

COOLANT FLOW PASSAGE STRUCTURE IN ROTATING MACHINE

TECHNICAL FIELD

The present invention is applied to various rotating machines such as a motor and a generator for driving an electric vehicle, and relates to a coolant flow passage structure for cooling the rotating machine.

BACKGROUND ART

Conventionally, as a flow passage structure that is applied to a motor and includes a cooling water passage through which cooling water flows on an outer circumferential surface of the motor, for example, a flow passage structure described in Patent Literature 1 is known. The motor has a cylindrical frame constituting an outer circumferential wall thereof, and a water jacket having a cooling water passage is provided so as to cover an outer circumferential surface of the frame. Specifically, the water jacket includes a cylindrical outer circumferential wall having an inner diameter larger than the outer diameter of the frame of the motor, and a plurality of fins disposed between the outer circumferential wall and the frame of the motor, extending by a predetermined length along the axial direction of the motor, and protruding in the radial direction of the motor. These fins are arranged in a state of being at predetermined intervals in the circumferential direction of the frame, and in a state in which one end portions in the length direction are alternately close to one side and the other side in the axial direction of the motor. Accordingly, a cooling water passage extending while meandering along the circumferential direction of the frame is formed on the outer circumferential surface side of the frame of the motor.

In addition, the water jacket is provided with a cooling water inlet and a cooling water outlet in a state of being adjacent to each other in the circumferential direction of the water jacket at an end portion on one side in the axial direction of the motor. Furthermore, the water jacket is provided with partition walls which are formed between the cooling water inlet and the cooling water outlet in substantially the same manner as the fins, extend over the entire motor in the axial direction, and partition the cooling water inlet side and the cooling water outlet side.

In the motor having the cooling water passage configured as described above, when the cooling water is fed to the cooling water inlet by a pump or the like, the cooling water flows while meandering along the cooling water passage, that is, along the circumferential direction of the frame on the outer peripheral surface of the frame of the motor. Then, the cooling water is discharged from the cooling water outlet to the outside after circulating almost once around the outer circumferential surface of the frame. As described above, since the cooling water flows on the outer circumferential surface of the frame of the motor, heat generation accompanying the rotation of the motor is suppressed by heat exchange with the cooling water, and the motor is efficiently cooled as compared with the air-cooling type.

CITATION LIST

Patent Literature

Patent Literature 1: JP S60-153653 U (FIG. 2)

SUMMARY OF INVENTION

Technical Problem

The motor including the cooling water passage has a configuration in which the cooling water passage extends while meandering along the circumferential direction of the frame. A portion having a large flow passage area that is a cross section and a portion having a small flow passage area are mixed in the cooling water passage. That is, in the cooling water passage, the flow passage area is not uniform, and the flow passage area is large or small. Therefore, the flow passage area of the cooling water passage changes many times before the cooling water flows from the cooling water inlet to the cooling water outlet, and at that time, a pressure loss is likely to occur in the cooling water flowing through the cooling water passage. When such a pressure loss increases, the smooth flow of the cooling water is inhibited, and as a result, the cooling efficiency of the motor decreases.

The present invention has been made to solve the above problems, and has an object to provide a coolant flow passage structure in a rotating machine capable of reducing a pressure loss of a coolant flowing through a flow passage, thereby securing a smooth flow of the coolant and improving cooling efficiency.

Solution to Problem

In order to achieve the above object, an invention according to claim 1 is a coolant flow passage structure in a rotating machine provided on a cylindrical outer circumferential wall in a rotating machine and cooling the rotating machine, the coolant flow passage structure in a rotating machine including: a flow passage main body provided in a thick wall portion of the outer circumferential wall so as to extend while meandering along a circumferential direction of the outer circumferential wall, the flow passage main body through which a coolant flows during cooling; and a bypass flow passage extending along a circumferential direction of the outer circumferential wall at one of both end portions in an axial direction of the outer circumferential wall, the bypass flow passage being provided so as to communicate portions with each other on identical end portion side of the outer circumferential wall in the flow passage main body, the bypass flow passage through which a coolant flows during cooling. The flow passage main body includes: a plurality of straight flow passage portions which extend along an axial direction of the outer circumferential wall and are disposed at predetermined intervals in a circumferential direction of the outer circumferential wall, and through which a coolant is allowed to linearly flow, and a plurality of reverse flow passage portions that is alternately connected to end portions on an identical side of the straight flow passage portions adjacent to each other on both end portion sides of the outer circumferential wall in a circumferential direction of the outer circumferential wall and reverses a direction in which a coolant flows.

According to this configuration, in the thick wall portion of the cylindrical outer circumferential wall of the rotating machine, a flow passage main body extending while meandering along the circumferential direction of the outer circumferential wall is provided. Specifically, the plurality of straight flow passage portions and the plurality of reverse flow passage portions constitute a flow passage main body extending while meandering along the circumferential direction of the outer circumferential wall. Accordingly, the coolant flowing through the flow passage main body during cooling of the rotating machine flows while meandering along the flow passage main body, that is, through the plurality of straight flow passage portions and the plurality of reverse flow passage portions and along the circumferential direction of the outer circumferential wall. As a result, heat generation accompanying the operation of the rotating machine can be suppressed by heat exchange with the coolant, and the rotating machine can be efficiently cooled as compared with the air-cooling type.

In addition, the outer circumferential wall of the motor is provided with a bypass flow passage that extends along the circumferential direction of the outer circumferential wall at one of both end portions in the axial direction of the motor and communicates portions with each other on the same end portion side of the outer circumferential wall in the flow passage main body, that is, reverse flow passage portions adjacent to each other with each other in the circumferential direction of the outer circumferential wall. In the flow passage main body extending while meandering along the circumferential direction of the outer circumferential wall, the pressure loss of the coolant tends to increase due to a large and rapid change in the flow direction of the coolant on the end portion side of the outer circumferential wall. Therefore, in the present invention, by providing the bypass flow passage so as to communicate the reverse flow passage portions with each other which are the portions on the same end portion side of the outer circumferential wall in the flow passage main body, the coolant is allowed to flow also in the bypass flow passage when the coolant flows on the end portion side of the outer circumferential wall in the flow passage main body, whereby the pressure loss of the coolant can be reduced. Accordingly, the pressure loss of the coolant can be reduced as compared with the case where the coolant flows through the flow passage main body without the bypass flow passage as described above, whereby a smooth flow of the coolant can be secured and the cooling efficiency of the rotating machine can be improved.

The invention according to claim 2 is characterized in that, in the coolant flow passage structure in a rotating machine according to claim 1, the bypass flow passage includes a plurality of bypass flow passage portions that respectively communicate the reverse flow passage portions adjacent to each other with each other in a circumferential direction of the outer circumferential wall.

According to this configuration, the bypass flow passage is configured by the plurality of bypass flow passage portions respectively communicating the reverse flow passage portions adjacent to each other with each other in the circumferential direction of the outer circumferential wall. With the flow passage structure including the flow passage main body having the straight flow passage portion and the reverse flow passage portion configured as described above and the bypass flow passage having the plurality of bypass flow passage portions, the function and effect of claim 1 described above can be more effectively achieved.

The invention according to claim 3 is characterized in that, in the coolant flow passage structure in a rotating machine according to claim 1, a coolant introduction portion for introducing a coolant and a coolant discharge portion for discharging a coolant are provided in each of the predetermined straight flow passage portions adjacent to each other.

According to this configuration, when the coolant is sent to the coolant introduction portion, the coolant flows into the straight flow passage portion provided with the coolant introduction portion. Then, with this straight flow passage portion as a starting point, the coolant goes around the outer circumferential wall once while meandering along the flow passage main body, that is, along the circumferential direction of the outer circumferential wall, and is discharged from the coolant discharge portion. As described above, since the coolant flows in the entire circumferential direction of the outer circumferential wall, the entire circumferential direction of the rotating machine can be efficiently cooled.

The invention according to claim 4 is characterized by, in the coolant flow passage structure in a rotating machine according to claim 3, further including a communication flow passage configured to communicate the reverse flow passage portion connected to an end portion of the straight flow passage portion provided with the coolant introduction portion and the reverse flow passage portion connected to an end portion of the straight flow passage portion provided with the coolant discharge portion.

According to this configuration, the reverse flow passage portion connected to the end portion of the straight flow passage portion provided with the coolant introduction portion and the reverse flow passage portion connected to the end portion of the straight flow passage portion provided with the coolant discharge portion are communicated by the communication flow passage. Accordingly, the plurality of reverse flow passage portions on the same end portion side of the outer circumferential wall of the flow passage main body, the plurality of bypass flow passage portions of the bypass flow passage, and the communication flow passage constitute a flow passage continuously extending along the circumferential direction on the entire outer circumferential wall, that is, a flow passage going around the outer circumferential wall once. By providing such a flow passage together with the flow passage main body, the pressure loss of the coolant flowing while meandering along the flow passage main body can be effectively reduced.

The invention according to claim 5 is characterized in that, in the coolant flow passage structure in a rotating machine according to claim 4, a flow passage area in a cross-section of the communication flow passage is set to be smaller than a flow passage area in a cross-section of each of the plurality of bypass flow passage portions.

According to this configuration, since the flow passage area in the cross-section of the communication flow passage is set to be smaller than the flow passage area in the cross-section of each of the bypass flow passage portions, when the coolant flows, it is possible to prevent the coolant from immediately flowing (backflow) from the coolant introduction portion to the coolant discharge portion through the communication flow passage.

The invention according to claim 6 is characterized in that, in the coolant flow passage structure in a rotating machine according to claim 2, among a plurality of respective reverse flow passage portions disposed at both end portions of the outer circumferential wall, a flow passage area in a cross-section of the reverse flow passage portion to which the bypass flow passage portion is not connected is set to be larger than a flow passage area in a cross-section of the reverse flow passage portion to which the bypass flow passage portion is connected.

According to this configuration, since the flow passage area in the cross-section of the reverse flow passage portion that is not connected to the bypass flow passage portion is set to be larger than the flow passage area in the cross-section of the reverse flow passage portion that is connected to the bypass flow passage portion, it is possible to secure a smooth flow of the coolant while reducing the pressure loss of the coolant as the entire flow passage as compared with the case where the flow passage areas of all the reverse flow passage portions are the same.

BRIEF DESCRIPTION OF DRAWINGS

FIG. 1A is a view showing a motor to which a coolant flow passage structure according to an embodiment of the present invention is applied, in which

FIG. 4A is a view showing a motor to which a cooling water flow passage structure in which a bypass flow passage and a communication flow passage are omitted is applied as a comparative example to the motor in FIG. 1A, in which

DESCRIPTION OF EMBODIMENTS

Figure 1A:
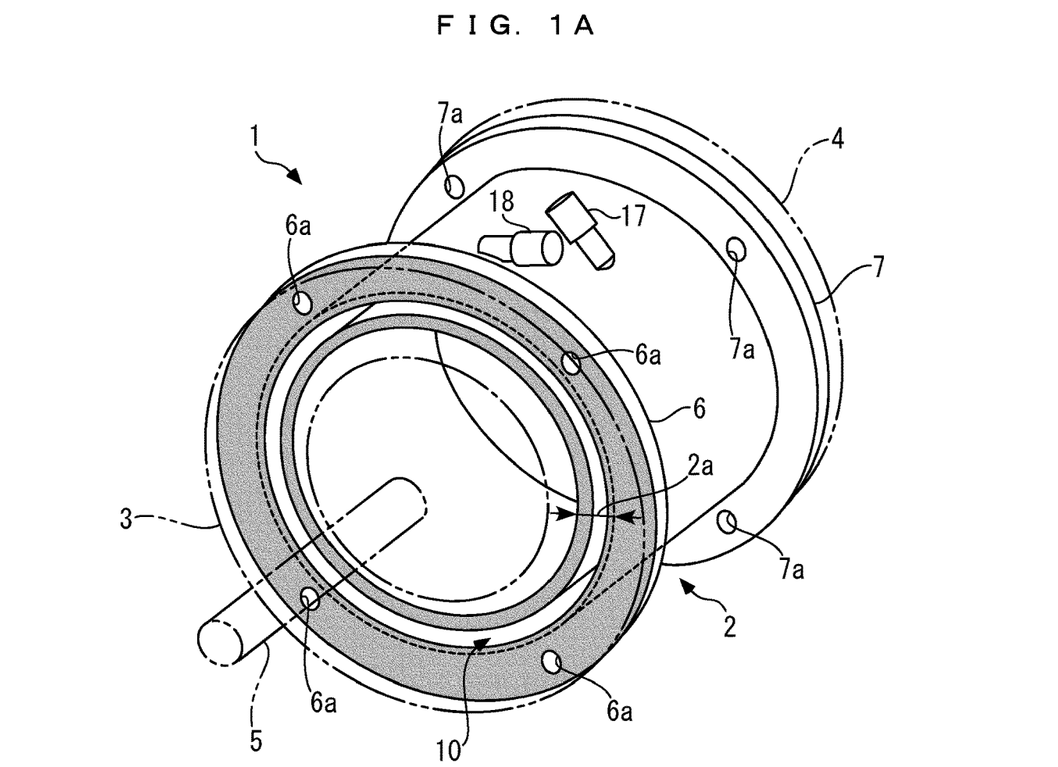
FIG. 1A is an external perspective view.

Hereinafter, preferred embodiments of the present invention will be described in detail with reference to the drawings. FIG. 1A shows an appearance of a motor to which a coolant flow passage structure according to an embodiment of the present invention is applied. It should be noted that the motor 1 (rotating machine) is used for, for example, a driving motor of an electric vehicle.

As shown in FIG. 1A, the motor 1 includes a frame 2 (outer circumferential wall) formed in a cylindrical shape, two brackets 3 and 4 joined to both axial respective end portions of the frame 2, a rotor (not shown) rotatably supported by both the brackets 3 and 4 through a bearing (not shown), a shaft 5 that rotates integrally with the rotor and protrudes forward from the bracket 3, and the like. In addition, a stator (not shown) is disposed between the frame 2 and the rotor on the inner circumferential surface of the frame 2.

It should be noted that in the following description, let a side which is a near side in FIG. 1A and on which the shaft 5 protrudes be a front side, on the other side, let the opposite side be a rear side, and let the brackets 3 and 4 be respectively referred to as a "front bracket 3" and a "rear bracket 4".

The frame 2 is manufactured by, for example, aluminum die-casting, and is formed, for the most part, in a cylindrical shape having a predetermined inner diameter, a predetermined outer diameter, and a relatively thick thick wall portion 2a. In addition, a front flange 6 and a rear flange 7 protruding by a predetermined length in the radial direction are provided at the front end portion and the rear end portion of the frame 2 in the axial direction, respectively. A plurality of (only four are shown in FIG. 1A) mounting holes 6a for bolting the front bracket 3 are formed in the front flange 6.

Similarly, a plurality of (only three are shown in FIG. 1A) mounting holes 7a for bolting the rear bracket 3 are formed also in the rear flange 7.

In addition, in the thick wall portion 2a of the frame 2, a flow passage 10 through which predetermined cooling water (coolant) for cooling the motor 1 flows is formed. The flow passage 10 has a predetermined depth (a predetermined thickness in the radial direction of the frame 2), and is formed in the thick wall portion 2a in a state of being opened to the front and the rear of the frame 2. Then, the front bracket 3 and the rear bracket 4 are respectively attached to the front flange 6 and the rear flange 7 of the frame 2 in a watertight state through a ring-shaped seal (not shown), thereby forming the flow passage 10.

Figure 1B:
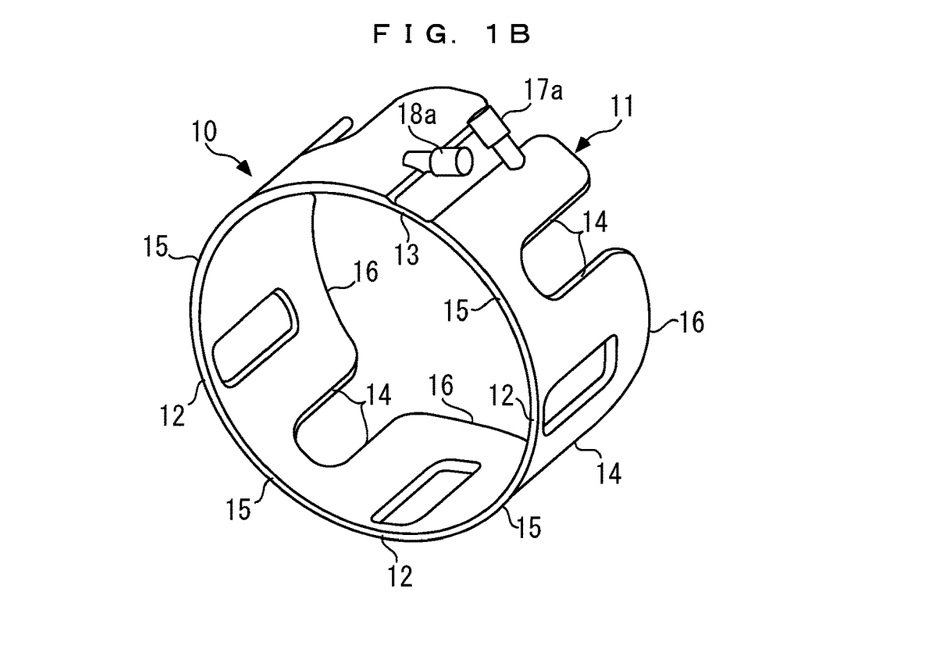
FIG. 1B is a perspective view showing a flow passage of cooling water formed in a thick wall portion of a frame.
Figure 2:
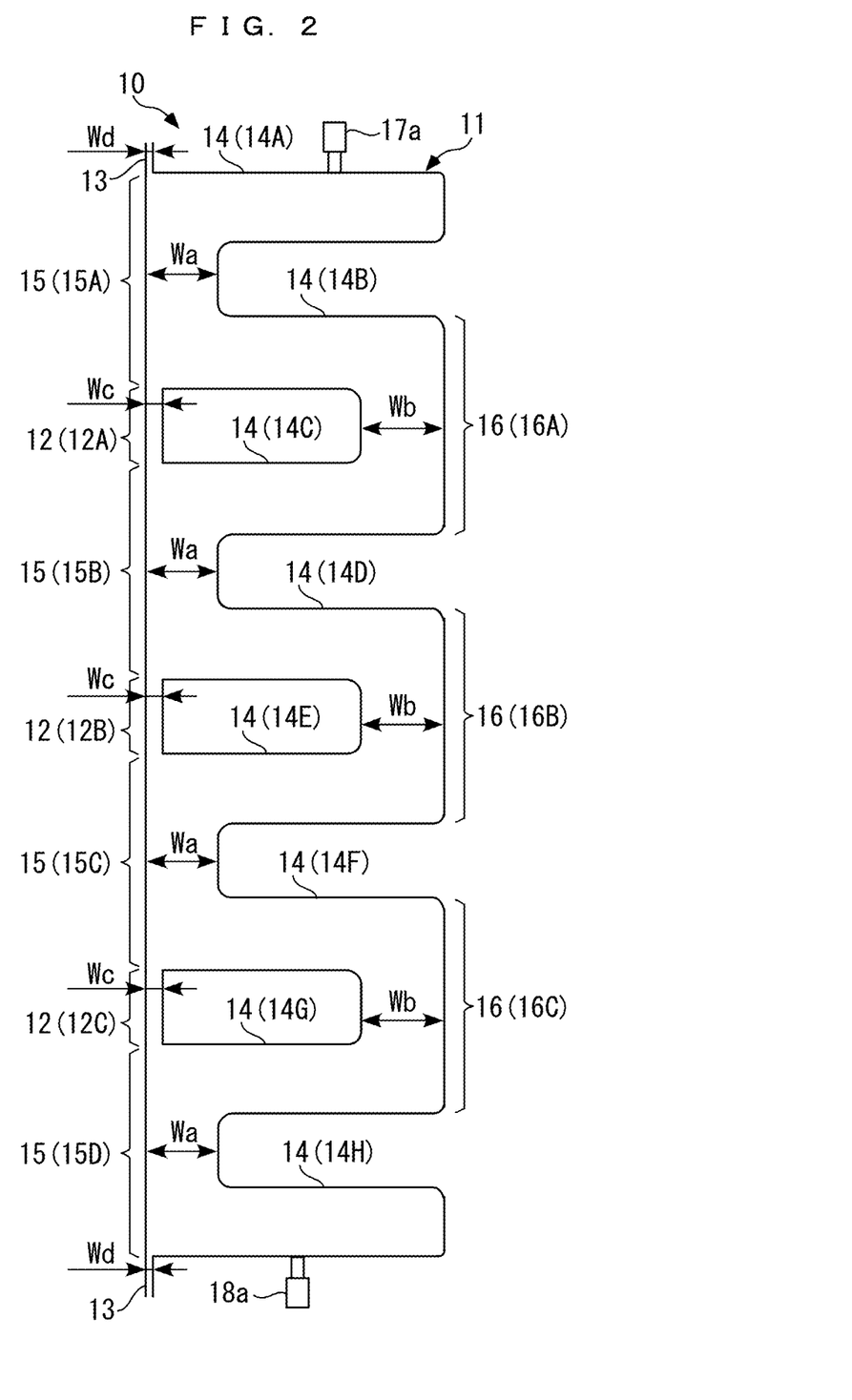
FIG. 2 is a view showing a flow passage of cooling water shown in FIG. 1B in a state of being developed in a circumferential direction of a frame.

FIG. 1B three-dimensionally shows the flow passage 10, and FIG. 2 shows the flow passage 10 in a state of being developed in the circumferential direction of the frame 2. As shown in both figures, the flow passage 10 includes a flow passage main body 11 that extends while meandering along the circumferential direction of the frame 2, a bypass flow passage 12 that communicates front side reverse flow passage portions 15 and 15 described below adjacent to each other with each other of the flow passage main body 11, and a communication flow passage 13 that communicates a first front side reverse flow passage portion 15A and a fourth front side reverse flow passage portion 15D described below.

As shown in FIGS. 1B and 2, the flow passage main body 11 includes a plurality of straight flow passage portions 14 extending along the axial direction (the left-right direction in FIG. 2) of the frame 2 and arranged at predetermined intervals in the circumferential direction (the up-down direction in FIG. 2) of the frame 2, a plurality of front side reverse flow passage portions 15 connected to the front end portions of the adjacent straight flow passage portions 14 and 14 and configured to reverse the flow direction of the cooling water, and a plurality of rear side reverse flow passage portions 16 connected to the rear end portions of the adjacent straight flow passage portions 14 and 14 and configured to reverse the flow direction of the cooling water.

Specifically, as shown in FIG. 2, the straight flow passage portion 14 includes eight straight flow passage portions constituted by first to eighth straight flow passage portions 14A to 14H. Any of these first to eighth straight flow passage portions 14A to 14H has a passage width of the same predetermined dimension.

In addition, the front side reverse flow passage portion 15 described above includes four front side reverse flow passage portions constituted by first to fourth front side reverse flow passage portions 15A to 15D respectively connected to front end portions (left end portions in FIG. 2) of first and second straight flow passage portions 14A and 14B, front end portions of third and fourth straight flow passage portions 14C and 14D, front end portions of fifth and sixth straight flow passage portions 14E and 14F, and front end portions of seventh and eighth straight flow passage portions 14G and 14H. Any of these first to fourth front side reverse flow passage portions 15A to 15D has a passage width Wa of the same predetermined dimension.

Furthermore, the rear side reverse flow passage portion 16 described above includes three rear side reverse flow passage portions constituted by first to third rear side reverse flow passage portions 16A to 16C respectively connected to rear end portions (right end portions in FIG. 2) of second and third straight flow passage portions 14B and 14C, rear end portions of fourth and fifth straight flow passage portions 14D and 14E, and rear end portions of sixth and seventh straight flow passage portions 14F and 14G. Any of these first to third rear side reverse flow passage portions 16A to 16C has the same passage width Wb of a predetermined dimension, and the passage width Wb is set to be larger than the passage width Wa of the first to fourth front side reverse flow passage portions 15A to 15D described above. Therefore, the flow passage area in the cross-section of the rear side reverse flow passage portion 16 is larger than the flow passage area of the front side reverse flow passage portion 15.

The bypass flow passage 12 extends along the circumferential direction of the frame 2 and is provided so as to communicate the front side reverse flow passage portions 15 and 15 adjacent to each other with each other. Specifically, as shown in FIG. 2, the bypass flow passage 12 includes three bypass flow passage portions constituted by first to third bypass flow passage portions 12A to 12C that respectively communicate the first and second front side reverse flow passage portions 15A and 15B with each other, the second and third front side reverse flow passage portions 15B and 15C with each other, and the third and fourth front side reverse flow passage portions 15C and 15D with each other. Any of these first to third bypass flow passage portions 12A to 12D has a passage width Wc of the same predetermined dimension.

As described above, the communication flow passage 13 communicates the first front side reverse flow passage portion 15A and the front side reverse flow passage portion 15D with each other. The communication flow passage 13 has a passage width Wd of a predetermined dimension, and the passage width Wd is set to be smaller than the passage width Wc of the first to third bypass flow passage portions 12A to 12C described above. Therefore, the flow passage area in the cross-section of the communication flow passage 13 is smaller than the flow passage areas of the first to third bypass flow passage portions 12A to 12C.

As shown in FIG. 1A, the frame 2 including the flow passage 10 configured as described above is provided with a cooling water introduction portion 17 for introducing cooling water into the flow passage 10 and a cooling water discharge portion 18 for discharging cooling water from the flow passage 10. Any of these cooling water introduction portion 17 and cooling water discharge portion 18 is formed in a substantially cylindrical shape, and the introduction flow passage portion 17a inside the cooling water introduction portion 17 is connected to a predetermined position of the first straight flow passage portion 14A of the flow passage main body 11, and the discharge flow passage portion 18a inside the cooling water discharge portion 18 is connected to a predetermined position of the eighth straight flow passage portion 14H of the flow passage main body 11.

Figure 3:
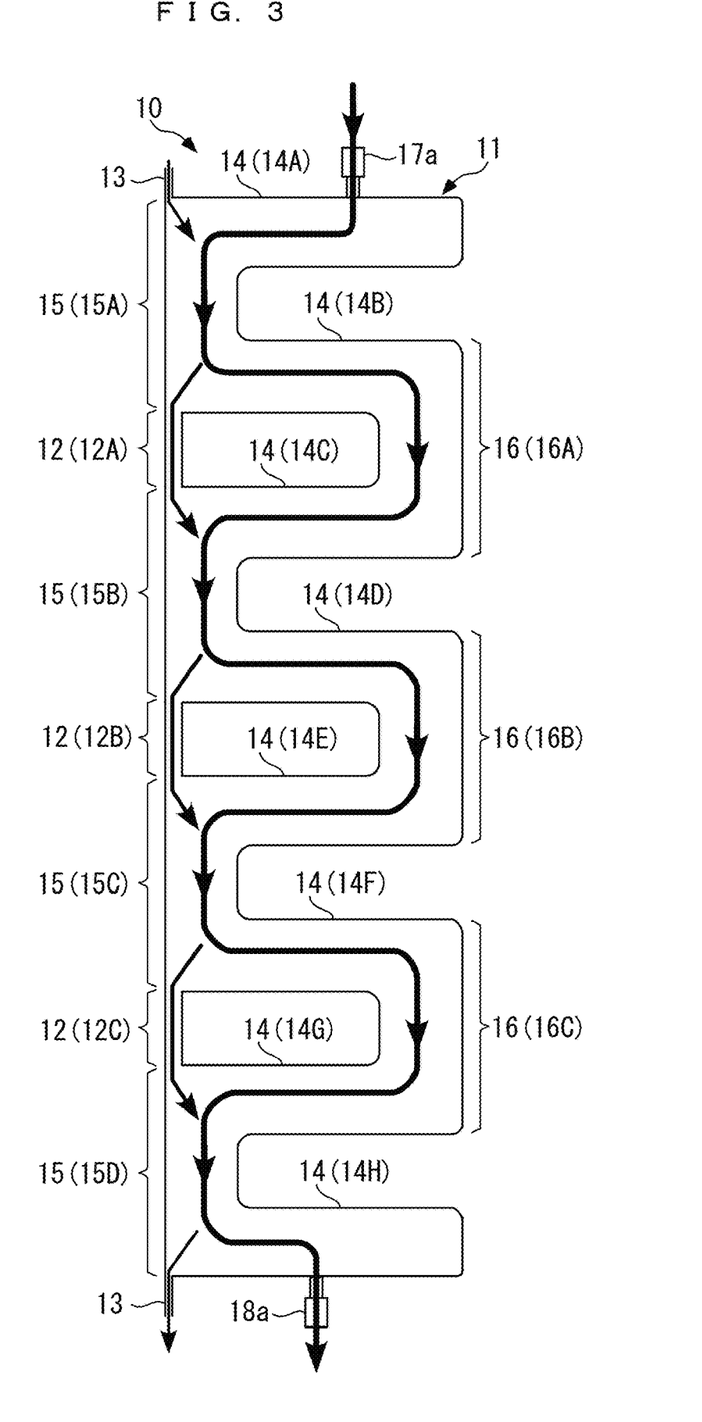
FIG. 3 is a view for illustrating a flow of cooling water in the flow passage shown in FIG. 2.

FIG. 3 shows a flow of cooling water in the flow passage 10. When the cooling water is sent to the cooling water introduction portion 17 by a pump (not shown) in order to cool the motor 1 in operation, the cooling water flows into the first straight flow passage portion 14A of the flow passage main body 11 through the introduction flow passage portion 17a in the cooling water introduction portion 17. The cooling water flows along the flow passage main body 11 as indicated by a thick arrow in FIG. 3. That is, the cooling water flowing into the flow passage main body 11 flows while meandering along the circumferential direction of the frame 2. Then, the cooling water having reached the eighth straight flow passage portion 14H is discharged to the outside through the discharge flow passage portion 18a in the cooling water discharge portion 18.

In addition, as described above, when the cooling water flows through the flow passage main body 11, as indicated by a thin arrow in FIG. 3, a part of the cooling water flowing through the first to third front side reverse flow passage portions 15A to 15C respectively flow through the first to third bypass flow passage portions 12A to 12C to the immediately downstream front side reverse flow passage portion 15.

Furthermore, substantially similarly to the first to third bypass flow passage portions 12A to 12C, in the communication flow passage 13, a part of the cooling water flowing through the fourth front side reverse flow passage portion 15D flows to the first front side reverse flow passage portion 15A through the communication flow passage 13.

Figure 4A:
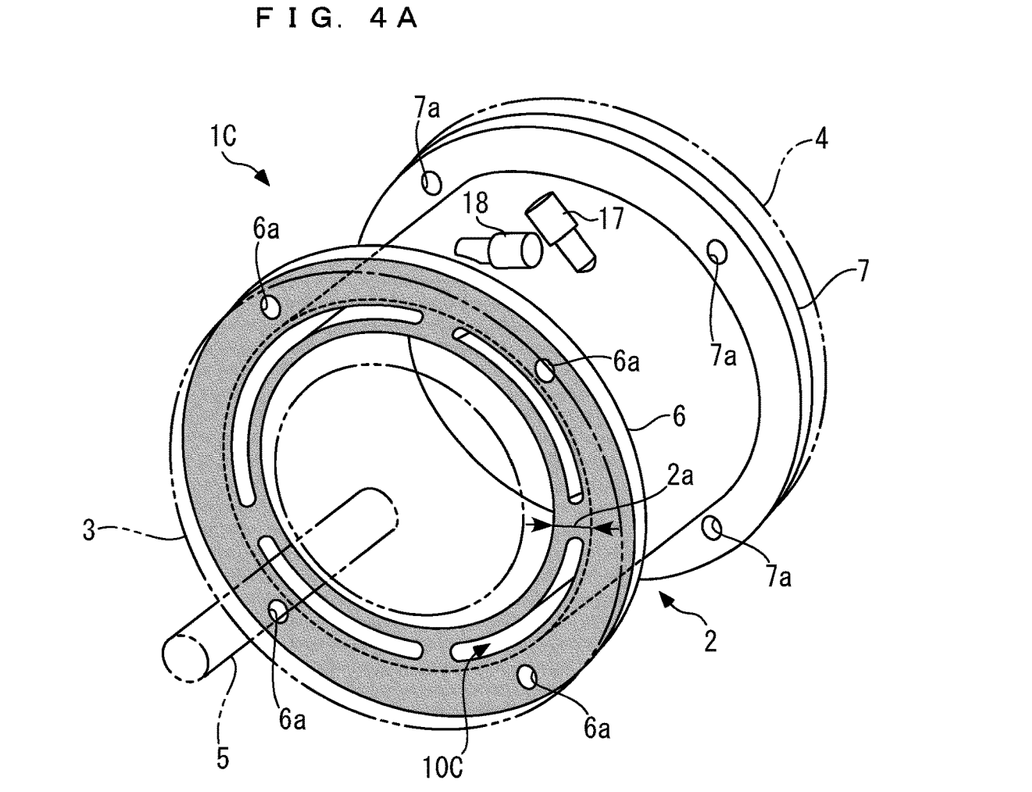
FIG. 4A is an external perspective view.
Figure 4B:
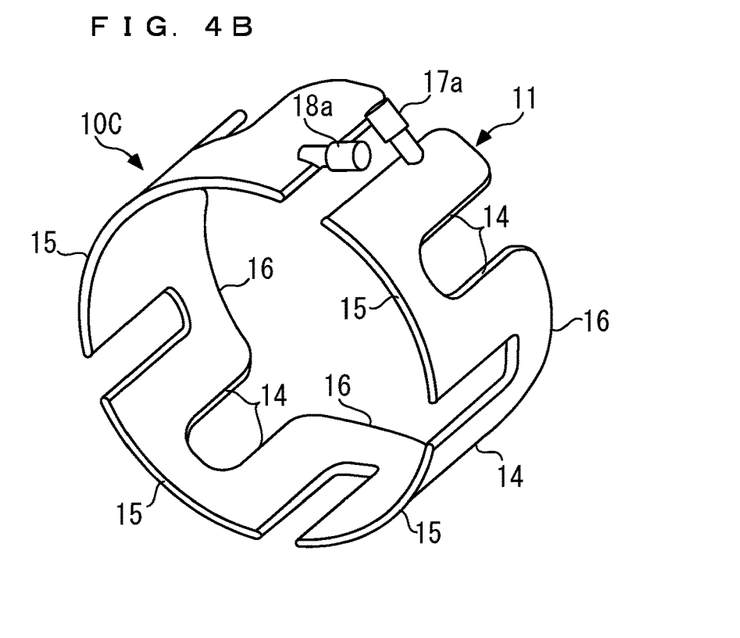
FIG. 4B is a perspective view showing a flow passage of cooling water formed in a thick wall portion of a frame.
Figure 5:
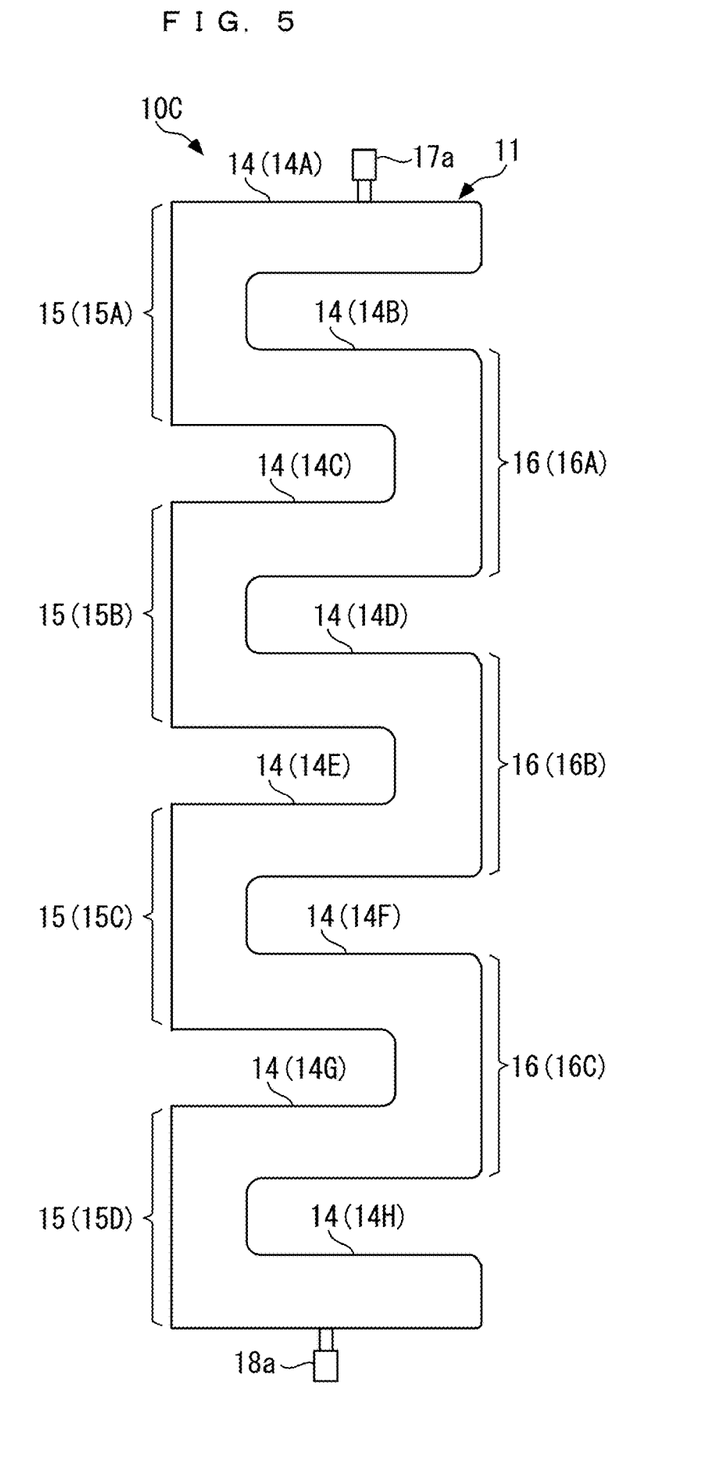
FIG. 5 is a view showing a flow passage of cooling water shown in FIG. 4B in a state of being developed in a circumferential direction of a frame.
Figure 6:
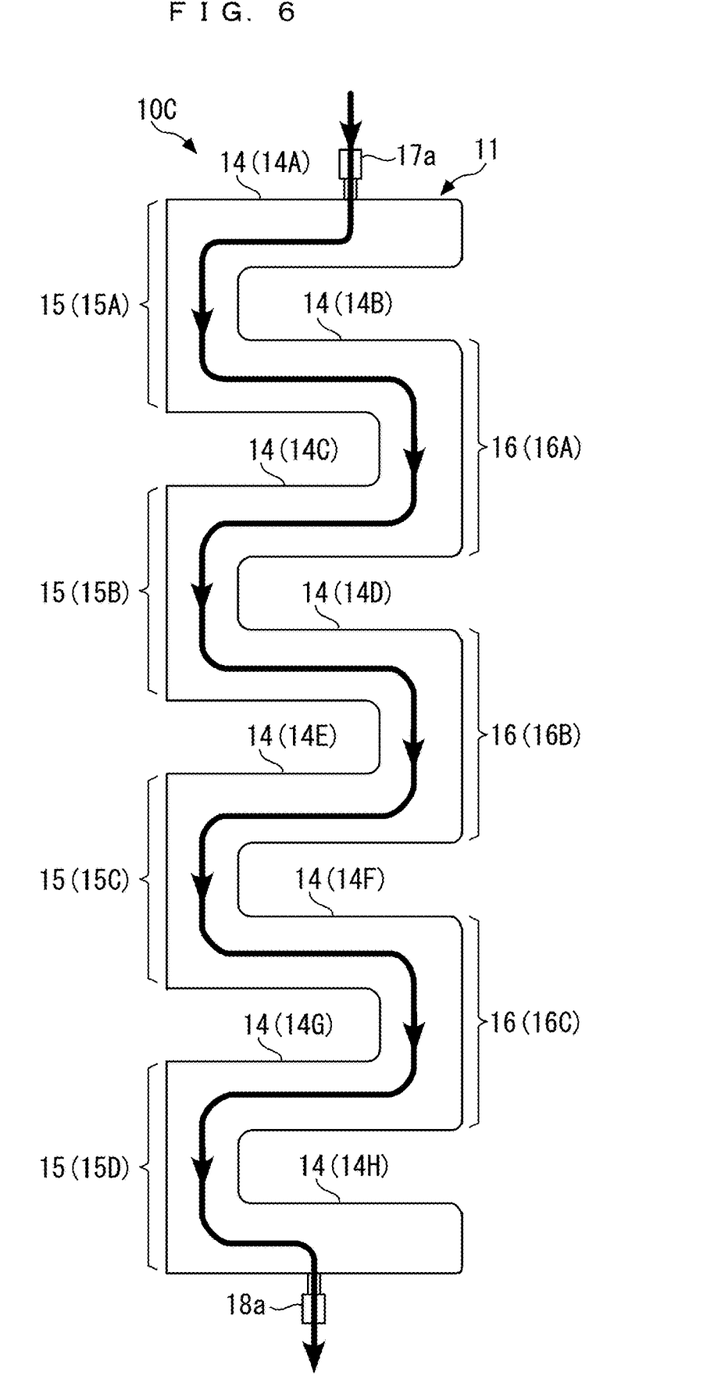
FIG. 6 is a view for illustrating a flow of cooling water in the flow passage shown in FIG. 5.

Here, as a comparative example to the above-described motor 1, with reference to FIGS. 4 to 6 respectively corresponding to FIGS. 1 to 3 described above, a flow passage structure of cooling water in a motor 1C including a flow passage 10C in which a bypass flow passage 12 and a communication flow passage 13 are omitted from the flow passage 10 of the present embodiment will be briefly described. It should be noted that in the following description, let the same components as those of the motor 1 and the flow passage 10 be denoted by the same reference numerals.

FIG. 4A shows an appearance of the motor 1C, and FIG. 4B shows a flow passage 10C formed in the frame 2 of the motor 1C. In addition, FIG. 5 shows the flow passage 10C in a state of being developed in the circumferential direction of the frame 2. As shown in FIGS. 4 and 5, the flow passage 10C provided in the frame 2 of the motor 1C has only the flow passage main body 11 and does not have the bypass flow passage 12 and the communication flow passage 13 with respect to the flow passage 10 of the present embodiment. Therefore, when the cooling water is sent to the flow passage 10C, the cooling water flows only along the flow passage main body 11 which meanders along the circumferential direction of the frame 2 as shown in FIG. 6.

On the other hand, in the flow passage 10 of the present embodiment, at the time of cooling the motor 1, as shown in FIG. 3 described above, the cooling water flows through the bypass flow passage 12 having the first to third bypass flow passage portions 12A to 12C and the communication flow passage 13, in addition to the flow passage main body 11 of the flow passage 10.

Accordingly, according to the present embodiment, the pressure loss of the cooling water flowing through the flow passage 10 can be reduced as compared with the flow passage 10C of the comparative example. It should be noted that although detailed data is omitted, as a result of analysis of a simulation in which cooling water flows in the flow passage 10 of the present embodiment and the flow passage 10C of the comparative example, it has been confirmed that the flow velocity of the cooling water flowing through the first to third front side reverse flow passage portions 15A to 15C of the flow passage 10 connected through the first to third bypass flow passage portions 12A to 12C rises more than that of the flow passage 10C (that is, the pressure loss of the flow passage 10 is reduced as compared with that of the flow passage 10C). Therefore, according to the present embodiment, since the pressure loss of the cooling water can be reduced, a smooth flow of the cooling water can be secured, and the cooling efficiency of the motor 1 can be improved.

In addition, in the flow passage 10 of the present embodiment, since the flow passage area in the cross-section of the communication flow passage 13 is set to be smaller than the flow passage area of the bypass flow passage 12 (the first to third bypass flow passage portions 12A to 12C), when the cooling water flows, it is possible to prevent the cooling water from immediately flowing (backflow) from the cooling water introduction portion 17 to the cooling water discharge portion 18 through the communication flow passage 13. Furthermore, in the flow passage 10, since the flow passage area in the cross-section of the rear side reverse flow passage portion 16 is set to be larger than the flow passage area of the front side reverse flow passage portion 15, it is possible to secure a smooth flow of the cooling water while reducing the pressure loss of the cooling water as the entire flow passage 10 as compared with the case where the flow passage areas of all the reverse flow passage portions 15 and 16 are the same.

It should be noted that the present invention is not limited to the above-described embodiments, and can be implemented in various modes. For example, in the present embodiment, the bypass flow passage 12 and the communication flow passage 13 are provided on the front end portion side of the frame 2 in the motor 1, but the present invention is not limited thereto. The bypass flow passage 12 and the communication flow passage 13 may be provided on the rear end portion side of the frame 2, and the adjacent rear side reverse flow passage portions 16 and 16 may communicate with each other by the bypass flow passage 12.

In addition, in the embodiment, the flow passage structure of the cooling water in the motor 1 as the rotating machine has been described, but the present invention can be applied to various rotating machines (for example, a generator and the like) that generate heat by operation. Furthermore, in the embodiment, the motor 1 is cooled by causing the cooling water to flow in the flow passage 10 of the motor 1, but another appropriate coolant (for example, cooling oil or the like) may be adopted instead of the above cooling water.

In addition, the detailed configurations and the like of the flow passage 10, the flow passage main body 11, the bypass flow passage 12, and the communication flow passage 13 indicated in the embodiment are merely exemplary and can be appropriately changed within the scope of the gist of the present invention. For example, in the flow passage 10 of the present embodiment, as shown in FIGS. 1B and 2, three bypass flow passages 12 (first to third bypass flow passage portions 12A to 12C) are provided at positions facing, in the axial direction, all the rear side reverse flow passage portions 16 (first to third rear side reverse flow passage portions 16A to 16C). However, for manufacturing reasons or the like, the bypass flow passages 12 may be disposed to be reduced to one or two places. Even in such a case, it is possible to obtain an effect of reducing the pressure loss of the cooling water as compared with the above-described flow passage 10C not including the bypass flow passage 12 at all.

REFERENCE SIGNS LIST 1 motor (rotating machine)
1C motor of comparative example
2 frame (outer circumferential wall)
2a thick wall portion of frame
3 front bracket
4 rear bracket
5 shaft
6 front flange
6a mounting hole
7 rear flange
7a mounting hole
10 flow passage
10C flow passage of comparative example
11 flow passage main body
12 bypass flow passage
12A to 12C first to third bypass flow passage portions
13 communication flow passage
14 straight flow passage portion
14A to 14H first to eighth straight flow path portions
15 front side reverse flow passage portion (reverse flow passage portion)
15A to 15D first to fourth front side reverse flow passage portions
16 rear side reverse flow passage portion (reverse flow passage portion)
16A to 16C first to third rear side reverse flow passage portions
17 cooling water introduction portion
17a introduction flow passage portion
18 cooling water discharge portion
18a discharge flow passage portion
Wa passage width of front side reverse flow passage portion
Wb passage width of rear side reverse flow passage portion
WC passage width of bypass flow passage portion
Wd passage width of communication flow passage

The invention claimed is:

1. A coolant flow passage structure in a rotating machine provided on a cylindrical outer circumferential wall in the rotating machine and cooling the rotating machine, the coolant flow passage structure in the rotating machine comprising:
   a flow passage main body provided in a thick wall portion of the outer circumferential wall so as to extend while meandering along a circumferential direction of the outer circumferential wall, the flow passage main body through which a coolant flows during cooling; and
   a bypass flow passage extending along the circumferential direction of the outer circumferential wall at an end portion side in an axial direction of the outer circumferential wall, the bypass flow passage being provided so as to communicate portions with each other on the end portion side of the outer circumferential wall in the flow passage main body, the coolant flowing through the bypass flow passage during cooling to reduce pressure loss of the coolant flowing on the end portion side of the outer circumferential wall in the flow passage main body,
   wherein the flow passage main body includes
   a plurality of straight flow passage portions extending along the axial direction of the outer circumferential wall, disposed at predetermined intervals in the circumferential direction of the outer circumferential wall, and through which the coolant is allowed to linearly flow, and
   a plurality of reverse flow passage portions connecting end portions on an identical side of the straight flow passage portions adjacent to each other on alternating end portion sides of the outer circumferential wall in the circumferential direction of the outer circumferential wall and reversing a direction in which the coolant flows,
   wherein the bypass flow passage includes a plurality of bypass flow passage portions that respectively communicate the reverse flow passage portions adjacent to each other with each other in the circumferential direction of the outer circumferential wall,
   wherein a coolant introduction portion for introducing the coolant and a coolant discharge portion for discharging the coolant are provided in straight flow passage portions adjacent to each other, and further comprising a communication flow passage configured to communicate the reverse flow passage portion connected to an end portion of the straight flow passage portion provided with the coolant introduction portion and the reverse flow passage portion connected to an end portion of the straight flow passage portion provided with the coolant discharge portion, wherein a flow passage area in a cross-section of the communication flow passage is set to be smaller than a flow passage area in a cross-section of each of the plurality of bypass flow passage portions.

2. The coolant flow passage structure in the rotating machine according to claim 1, wherein among a plurality of respective reverse flow passage portions disposed at the both end portions of the outer circumferential wall, a flow passage area in a cross-section of the reverse flow passage portion to which the bypass flow passage portion is not connected is set to be larger than a flow passage area in a cross-section of the reverse flow passage portion to which the bypass flow passage portion is connected.

* * * * *